No. 650,817. Patented June 5, 1900.
C. BRADWAY.
HOOK AND EYE.
(Application filed Oct. 26, 1899.)

(No Model.)

WITNESSES:

INVENTOR

Chattin Bradway.

UNITED STATES PATENT OFFICE.

CHATTIN BRADWAY, OF PHILADELPHIA, PENNSYLVANIA.

HOOK AND EYE.

SPECIFICATION forming part of Letters Patent No. 650,817, dated June 5, 1900.

Application filed October 26, 1899. Serial No. 734,803. (No model.)

*To all whom it may concern:*

Be it known that I, CHATTIN BRADWAY, a citizen of the United States, residing at No. 546 North Fifty-third street, Philadelphia, in the county of Philadelphia and State of Pennsylvania, have invented new and useful Improvements in Hooks and Eyes, of which the following is a specification.

My invention relates to a self-fastening hook and eye, and has for its object to provide a hook and eye which while being self-fastening can be additionally secured by thread.

The novel features of construction will be more fully described and specified in the appended claims, reference being had to the accompanying drawings, in which—

Figure 1:
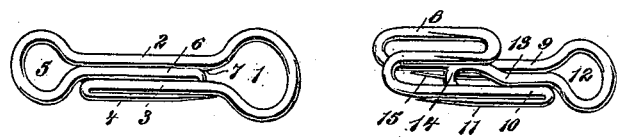
Figure 2:
Figure 3:
Figure 4:

Figure 1 is a perspective view of a hook and eye embodying my invention. Fig. 2 is a side view thereof. Fig. 3 is a bottom plan view of the hook and eye. Fig. 4 is the other side view of the hook and eye.

In the drawings similar numerals correspond to similar parts in the several views.

Referring to the eye, which is comprised of a single length of wire, 1 represents the loop, and 2 and 3 the shank members, the latter of which has turned back upon itself the pin 4. The shank member 3 is prolonged into the loop or thread-eye 5, from which is continued inwardly the central member 6, comprised of a double thickness of wire. The bottom of the central member has turned back upon itself the pin 7. The hook is likewise comprised of a single length of wire, 8 representing the bill, and 9 and 10 the shank members. The shank member 10 has turned upon itself the pin 11 and the other shank member 9 has formed from itself the thread loop or eye 12, and continuing inwardly therefrom is the central member 13, which is formed of two thicknesses of wire, one being bent upon the other, and at the point of bending is provided the swell or node 14. Turned back upon the bottom thickness of the central member is the pin 15.

Having thus described my invention, what I claim as new, and desire to secure by Letters Patent, is—

1. A hook and eye, each provided with a shank of two members, one of which having turned upon itself a pin member, the other member prolonged to form a thread-eye, continuing therefrom a central member of two thicknesses of wire, the bottom of said central member being turned upon itself to form a pin, substantially as described.

2. A hook having a shank of two members, one turning back upon itself forming a pin, the other having formed at its end a thread-eye, from which extends inwardly a central member of two thicknesses of wire, one bent upon the other, a swell or node at the point of bending, the bottom of said central member forming a pin by turning upon itself, substantially as described.

In testimony whereof I affix my signature in presence of two witnesses.

CHATTIN BRADWAY.

Witnesses:
    JUDSON H. BRADWAY,
    C. W. BRADWAY.